(12) United States Patent
Seuser et al.

(10) Patent No.: US 8,307,960 B2
(45) Date of Patent: Nov. 13, 2012

(54) SINGLE-PART CARRIER FOR AN ELECTRIC PARKING BRAKE ACTUATOR WITH PLANETARY GEAR SET

(75) Inventors: Ulrich Seuser, Neuwied (DE); Andre Busse, Koblenz (DE); Gregor Poertzgen, Koblenz (DE)

(73) Assignee: Lucas Automotive GmbH, Koblenz (DE)

( * ) Notice: Subject to any disclaimer, the term of this patent is extended or adjusted under 35 U.S.C. 154(b) by 547 days.

(21) Appl. No.: 12/445,807

(22) PCT Filed: Oct. 17, 2007

(86) PCT No.: PCT/EP2007/009002
§ 371 (c)(1),
(2), (4) Date: Apr. 16, 2009

(87) PCT Pub. No.: WO2008/046605
PCT Pub. Date: Apr. 24, 2008

(65) Prior Publication Data
US 2010/0320041 A1    Dec. 23, 2010

(30) Foreign Application Priority Data
Oct. 18, 2006   (DE) .......................... 10 2006 049 229

(51) Int. Cl.
*F16D 65/14* (2006.01)
(52) U.S. Cl. ........................................ 188/162; 188/156
(58) Field of Classification Search .................. 188/2 D, 188/156–162
See application file for complete search history.

(56) References Cited

U.S. PATENT DOCUMENTS

| | | | | |
|---|---|---|---|---|
| 2,095,207 | A | * | 10/1937 | Walter .......................... 475/149 |
| 5,779,589 | A | | 7/1998 | Fütterer |
| 6,080,077 | A | * | 6/2000 | Kamlukin ..................... 475/339 |
| 2002/0183157 | A1 | | 12/2002 | Ballinger et al. |
| 2003/0232694 | A1 | | 12/2003 | Buhrke |
| 2004/0082420 | A1 | * | 4/2004 | Robinson ...................... 475/183 |
| 2004/0178028 | A1 | * | 9/2004 | Farmer et al. ................. 188/162 |
| 2005/0215390 | A1 | | 9/2005 | Poulin et al. |
| 2006/0000679 | A1 | * | 1/2006 | Hanna et al. ............... 188/106 P |
| 2007/0151816 | A1 | * | 7/2007 | Gil et al. ....................... 188/2 D |
| 2008/0293534 | A1 | * | 11/2008 | Dettenberger et al. ....... 475/154 |
| 2009/0050420 | A1 | * | 2/2009 | Poertzgen .................... 188/156 |

FOREIGN PATENT DOCUMENTS

DE     3840685 A1    6/1990
(Continued)

OTHER PUBLICATIONS

Chinese Office Action for Application No. 2007800388195 dated Nov. 24, 2011.

*Primary Examiner* — Christopher Schwartz
(74) *Attorney, Agent, or Firm* — MacMillan, Sobanski & Todd, LLC

(57) ABSTRACT

A brake actuator for an electrical parking brake comprises an electric motor and a planetary gear set. The axes on which the planet wheels are carried on the planet carrier are joined substance-to-substance to the planet carrier, i.e. formed in one piece with it or for instance mounted on its surface by means of atomic or molecular forces. Recesses on the axes can receive a lubricant. Spacers between the planet carrier and planet wheels can reduce the contact surface in the axial direction.

20 Claims, 7 Drawing Sheets

FOREIGN PATENT DOCUMENTS

| | | |
|---|---|---|
| DE | 19546586 A1 | 6/1997 |
| DE | 29623080 U1 | 10/1997 |
| DE | 19711423 C1 | 9/1998 |
| DE | 10226796 A1 | 1/2004 |
| DE | 102004048700 A1 | 5/2006 |
| DE | 102005021767 A1 | 9/2006 |
| EP | 0844417 A2 | 5/1998 |
| GB | 1479414 | 7/1977 |
| WO | 2004043753 A1 | 5/2004 |
| WO | 2006094804 A1 | 9/2006 |

\* cited by examiner

SINGLE-PART CARRIER FOR AN ELECTRIC PARKING BRAKE ACTUATOR WITH PLANETARY GEAR SET

CROSS-REFERENCE TO RELATED APPLICATIONS

This application is a National Stage of International Application No. PCT/EP2007/009002 filed Oct. 17, 2007, the disclosures of which are incorporated herein by reference in their entirety, and which claimed priority to German Patent Application No. 10 2006 049 229.3 filed Oct. 18, 2006, the disclosures of which are incorporated herein by reference in their entirety.

BACKGROUND OF THE INVENTION

The invention concerns the field of brakes, and of motor vehicle brakes in particular. More precisely, the invention concerns a parking brake actuator which can be operated by an electric motor.

Actuators, operated by electric motors, for parking brakes (also called holding brakes) are used in motor vehicles. The advantage of this realization compared with brakes which are operated exclusively by cables or hydraulics is the fact that the driver does not have to apply great muscular force to operate the brake. A parking brake which can be operated electrically can also be combined well with modern vehicle electronics.

Such parking brakes are commonly operated by means of an actuator, which usually has an electric motor with gearing connected downstream from it. The gearing can consist of several stages, and various gearing technologies can be used. For instance, gearing stages in the form of belt drives, worm gear pairs, cylindrical gearing or planetary gear sets are known. The advantages of using a planetary gear set are its compact construction, the high degree of reduction per stage, and the possibility of transmitting a high torque. On the other hand, the disadvantage is that because of the higher number of moving parts per stage compared with other forms of gearing, increased development of noise must be expected. Also, the planetary gear set is consequently more expensive to produce, and potentially its efficiency is less advantageous.

Usually, planet wheel bearing devices for planetary gear set stages which are loaded by high torques are manufactured separately from the planet carrier, and joined non-positively to the planet carrier in a manufacturing step. The generally preferred joining technique here is mating, in which steel bearing devices are fitted into recesses of a planet carrier. A disadvantage here is that the mating hole and if appropriate the corresponding mating surface must be manufactured with great precision before the parts are joined to each other. Manufacture of such parts is expensive, and requires increased attention to quality control, resulting in increased unit costs.

Additionally, brake actuators are exposed to increased requirements regarding resistance to impacts, vibration, corrosion and increased temperature. In all operating conditions, the mechanical resistance of the gearing should be constant as far as possible, to be able to provide reproducible brake application forces.

This invention is therefore based on the feature of providing an optimised actuator for an electrical parking brake.

BRIEF SUMMARY OF THE INVENTION

According to a first feature of the invention, an actuator for an electrical parking brake is provided, the actuator comprising an electric motor and a planetary gear set which is connected downstream from the electric motor, and the planetary gear set having at least one planet carrier, which has multiple bearing devices for rotatable bearing of planet wheels, the bearing devices being joined substance-to-substance to the planet carrier.

Joints where the joined parts are held together by atomic or molecular forces are called substance-to-substance here. In particular, substance-to-substance joints can be produced by soldering, welding, gluing or vulcanisation. The single-part embodiment of the planet carrier with the bearing devices should also be seen as substance-to-substance. Accordingly, the bearing devices can be formed in one part with the planet carrier, or be separate elements, which however are joined by a fusion joining process to, for instance, the surface of the planet carrier.

Every bearing device preferably has an outer diameter of at least about one third of the greatest outer diameter of the planet wheel which it carries. Other, particularly numerically higher size ratios are possible; the size ratio can, for instance, be 2/5, 1/2 or higher.

In a variant, the diameter of a bearing device is greater than its axial extent. For instance, the diameter can be 120% of the axial extent.

Preferably, the bearing devices are of at least approximately cylindrical form. Alternatively, other forms can be used, e.g. those of truncated cones. The bearing devices can be implemented in non-massive construction, in which case a recess can be provided on the inside of each bearing device, corresponding in its shape to, for instance, the outer shape of the bearing device. Preferably, a cylindrical recess, the normal axis of which runs coaxially to the axis of rotation of the planet wheel, is used. The bearing devices can thus be implemented as hollow cylinders or partly hollow cylinders.

At least one bearing device can have at least one recess on its bearing surface facing the planet wheels. This recess preferably extends in the axial direction, and if the basic form of the bearing device is cylindrical, it can have the cross-section of a segment of arc. The recess can at least partly be filled with a lubricant. Preferably, a grease with low viscosity and high temperature stability is used for this purpose.

Increased play in the arrangement can be created by such a recess, and can help to compensate for certain construction faults. For instance, if a double fit is present, and only comes to light at operating temperature, the increased play between planet wheel and bearing device because of the recess ensures that increased frictional forces do not occur, or are weakened.

Spacer bodies, which determine the minimum distance between the planet carrier and a planet wheel in the latter's axial direction, can be used. One or more of these spacer bodies can be formed on the planet wheel. One or more spacer bodies can also be formed on the planet carrier. In both cases, a lubricant can be inserted in the resulting space between the planet carrier and the planet wheel.

The planet carrier and/or the planet wheel can be manufactured from a plastic, in particular polyphenyl sulfide. It is possible to produce the planet carrier by the cold forging method.

The planet carrier can include a driven shaft, which is joined to the planet carrier in a torque-locked manner by means of a polygon profile. As joint types between the driven shaft and the planet carrier, all torque-locked joints come into question.

According to a further feature, the invention is directed at an electrical parking brake, which includes an actuator as described here. For instance, via the drive shaft, friction bodies can be pressed against a brake drum or brake disc with a fixed axis by means of preferably self-locking gearing.

Other advantages of this invention will become apparent to those skilled in the art from the following detailed description of the preferred embodiments, when read in light of the accompanying drawings.

DETAILED DESCRIPTION OF THE INVENTION

In the following, an embodiment of an electrical parking brake actuator with a planetary gear set is described. The described brake actuator outputs a torque which can be used to operate a vehicle brake (not shown) in parking brake operation.

Figure 1:
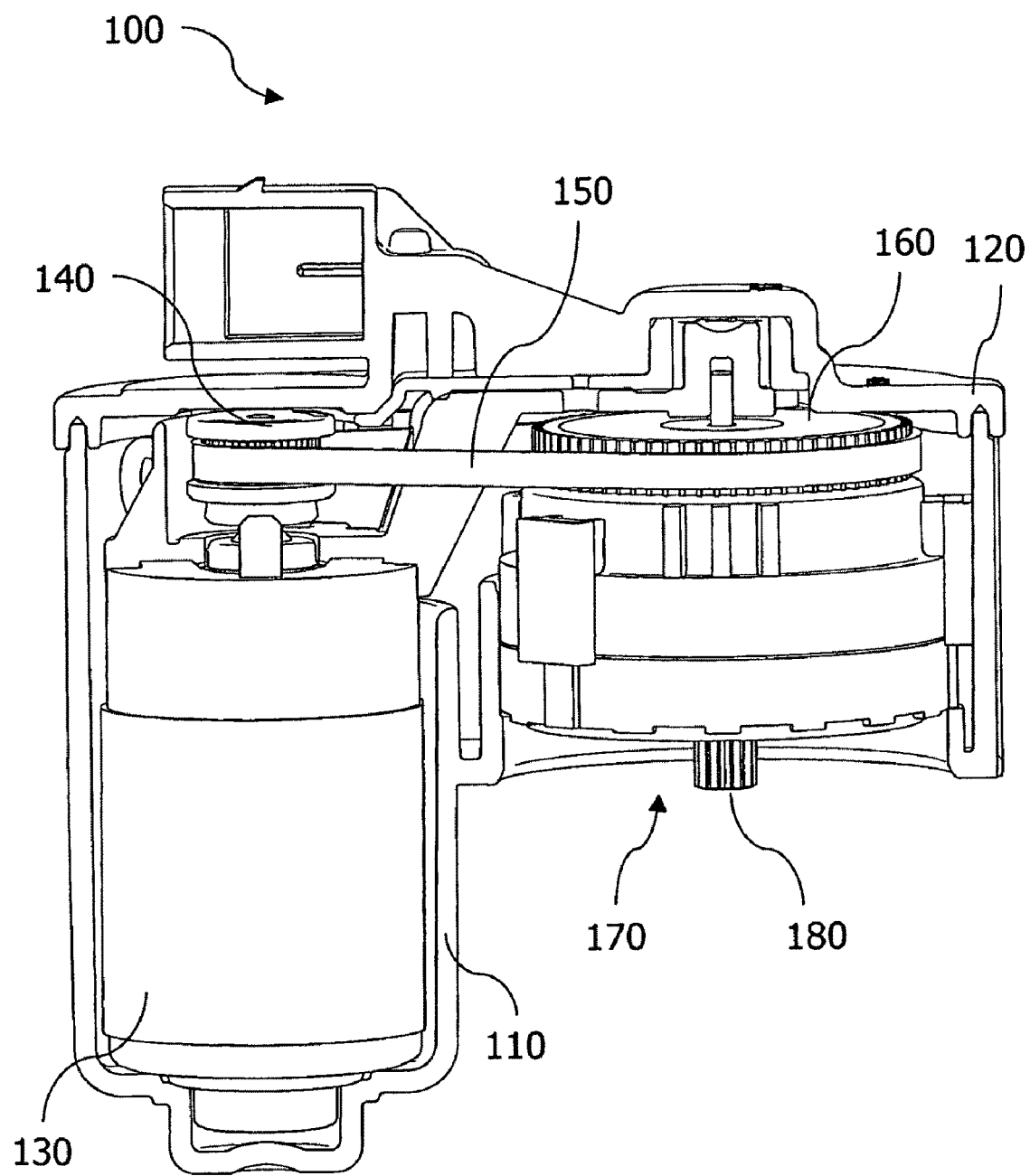
FIG. 1 shows an embodiment of a brake actuator with electric motor, belt drive and multi-stage planetary gear set.

FIG. 1 shows an electrical parking brake actuator 100, which includes a housing 110 with a housing cover 120. An electric motor 130, which is housed in the housing 110, is activated electrically if required, and drives a first toothed belt pulley 140, which is coupled via a toothed belt 150 to a second toothed belt pulley 160. Instead of the belt drive 140, 150, 160, other gearing such as cylindrical gearing, helical gearing or a planetary gear set can be used. A planetary gear set 170 is connected downstream from the belt drive 140, 150, 160. The planetary gear set 170 could also be connected to the motor 130 in a torque-locked manner, without using the belt drive 140, 150, 160.

Figure 2:
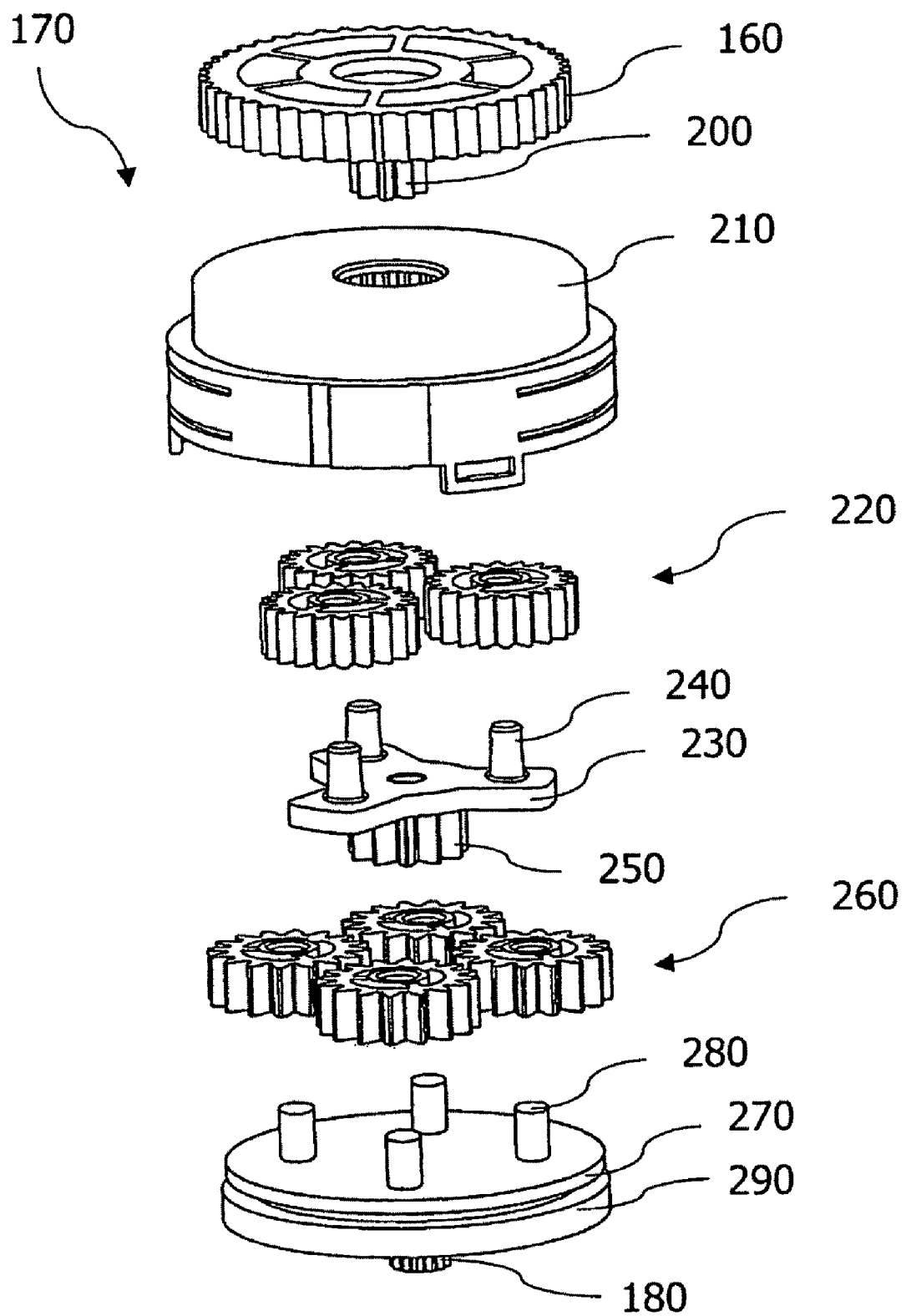
FIG. 2 shows an exploded drawing of a first embodiment of the planetary gear set from FIG. 1.

The embodiment of the planetary gear set 170 shown here is a two-stage embodiment (see FIG. 2). At the lower end of the planetary gear set 170 is the driven shaft 180, which can deliver its torque to a brake application or force holding mechanism of the parking brake.

FIG. 2 shows an exploded representation of the two-stage planetary gear set 170. The gearing 170 is driven via the toothed belt pulley 160, which is driven in the described manner by the electric motor 130. The toothed belt pulley 160 has a centrally arranged first sun gear 200, which dips into an internal gear 210 from above. In the shown embodiment, the internal gear 210 has two internal sets of teeth, which are only partly visible. Depending on the teeth of the planet wheels described below, these internal sets of teeth can be of the same or different pitch and width.

Three planet wheels 220 run in the upper set of teeth of the internal gear 210. Each planet wheel 220 engages simultaneously with the first sun wheel 200 and an internal set of teeth of the internal gear 210. The planet wheels 220 are carried on bearing devices 240, which extend upward in FIG. 2 from a first planet carrier 230. In this embodiment, only the bearing devices of a second stage of the planetary gear set 170 are formed according to the invention; the bearing devices 240 of the planet wheels 220 can correspond to the prior art. However, according to the invention the bearing devices 240 can also be attached by a fusion joining process to the first planet carrier 230, or be formed in one piece with it.

The first planet carrier 230 is joined in a torque-locked manner to a sun gear 250. Substance-to-substance joining of the two elements is possible, as are joining by pressing, riveting, bolting, shrinking or another joining technique.

The sun gear 250 of the first planet carrier 230 engages with a set of four further planet wheels 260. In the shown embodiment, the planet wheels 260 and the sun gear 250 have the same teeth, which are different from those of the planet wheels 220 and sun gear 200. Correspondingly, the internal gear 210 has two different internal sets of teeth (not visible in the figure), with which the planet wheels 220 and planet wheels 260 engage. The planet wheels 260 engage with the lower internal teeth of the internal gear 210, and the planet wheels 220 engage with the upper internal teeth.

The shown two-stage planetary gear set reduces the rotational speed which is introduced on the toothed belt pulley 160 in two stages. The first stage consists of the first sun gear 200, the planet wheels 220, the upper part of the internal gear 210 and the planet carrier 230 with the bearing devices 240. The second stage consists of the second sun gear 250, the planet wheels 260, the lower part of the internal gear 210 and the second planet carrier 270 with cylindrical bearing devices 280 for the planet carriers 260. The planet carrier 270 and the bearing devices 280 are formed in one piece.

Since, in the course of the rotational speed reduction of the two planetary gear set stages, the torque is also increased in each case, the torque which acts on the planet wheels 260 is greater than that which acts on the planet wheels 220. For this reason, a preferred embodiment provides that the sets of teeth of the planet wheels 260 are coarser than those of the planet wheels 220. However, the teeth of the planet wheels 260 can also be the same or finer. In any case, the teeth of the engaging sun gears, planet wheels and internal gears must correspond.

In the shown embodiment, a lower cover 290, together with the internal gear 210, forms a housing of the two-stage planetary gear set. The torque is delivered via the driven shaft 180, which is joined coaxially and in a torque-locked manner to the lower planet carrier 270.

Figure 3:
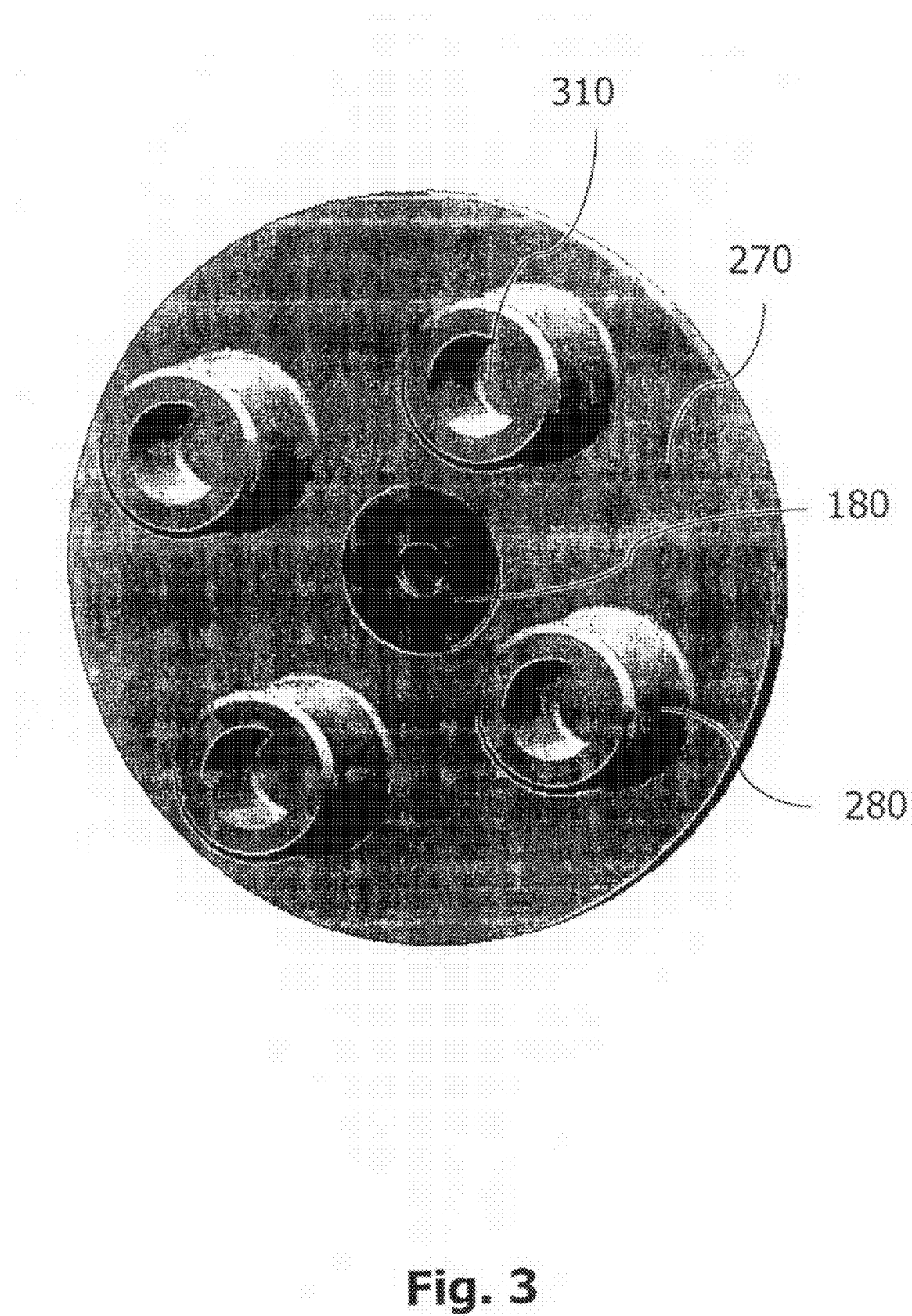
FIG. 3 shows a perspective representation of a planet carrier, for use with a planetary gear set of an actuator according to the invention of an electrical parking brake.

FIG. 3 shows a further embodiment of the second planet carrier 270 with the bearing devices 280. In contrast to FIG. 2, the lower planet carrier 270 has cylindrical bearing devices 280 which are of greater diameter and also have coaxial cavities 310. Each of the cavities 310 can also be of a different form; in particular, it can have a base of any shape, and not be cylindrical.

In this embodiment, the second planet carrier is in a form with a circular base. However, other bases can also be used, e.g. square, polygonal or star-shaped (see the upper planet carrier 230 in FIG. 2).

The bearing devices 280 are attached substance-to-substance to the surface of the planet carrier 270 shown in FIG. 3. In the shown embodiment, four bearing devices 280 are used for as many planet wheels 260. However, a greater or smaller number of planet wheels 260 and bearing devices 280 can also be used. In practice, a number of three to four planet wheels 260 and bearing devices 280 has proved itself. The centres of the bearing devices 280 are preferably at equal intervals on a circular curve, which has the same centre as the driven shaft 180. All planet wheels 260 have the same dimensions and uniform sets of teeth.

According to FIG. 3, the outer diameters of the bearing devices 280 are preferably greater than their axial extents. However, depending on the nature of the used materials and the stresses during operation, the diameters of the bearing devices 280 can also be less than their axial extents. In this embodiment, the bearing devices 280 have a diameter of more than one third of the greatest outer diameter of the planet wheels 260.

In practice, choosing the outer diameters of the bearing devices 280 to be relatively large compared with the diameters of the planet wheels 260 has proved itself. What is achieved in this way is that the frictional and shearing forces on the bearing devices 280 are distributed over a greater area, so that the stress on material and the noise development are reduced. The use of plastic for the bearing devices 280 and/or the planet wheels 260 is made significantly easier in this way. In particular, this embodiment provides for producing the bearing devices 280 and the lower planet carrier 260 by the cold forging method. This production method allows inexpensive production of a sufficiently loadable embodiment of the invention.

The remaining material thickness between the teeth of the planet wheels 260 and their bearing surfaces should not be chosen to be too small, so that sufficient material for stable transmission of force and torque is present. It may be necessary to compensate for a small material thickness in the radial direction by a greater extent of the planet wheels 260 in the axial direction. If this material thickness is too small, deformation of the gear wheels when the gearing is operated, and resulting material fatigue, must be expected.

Figure 4:
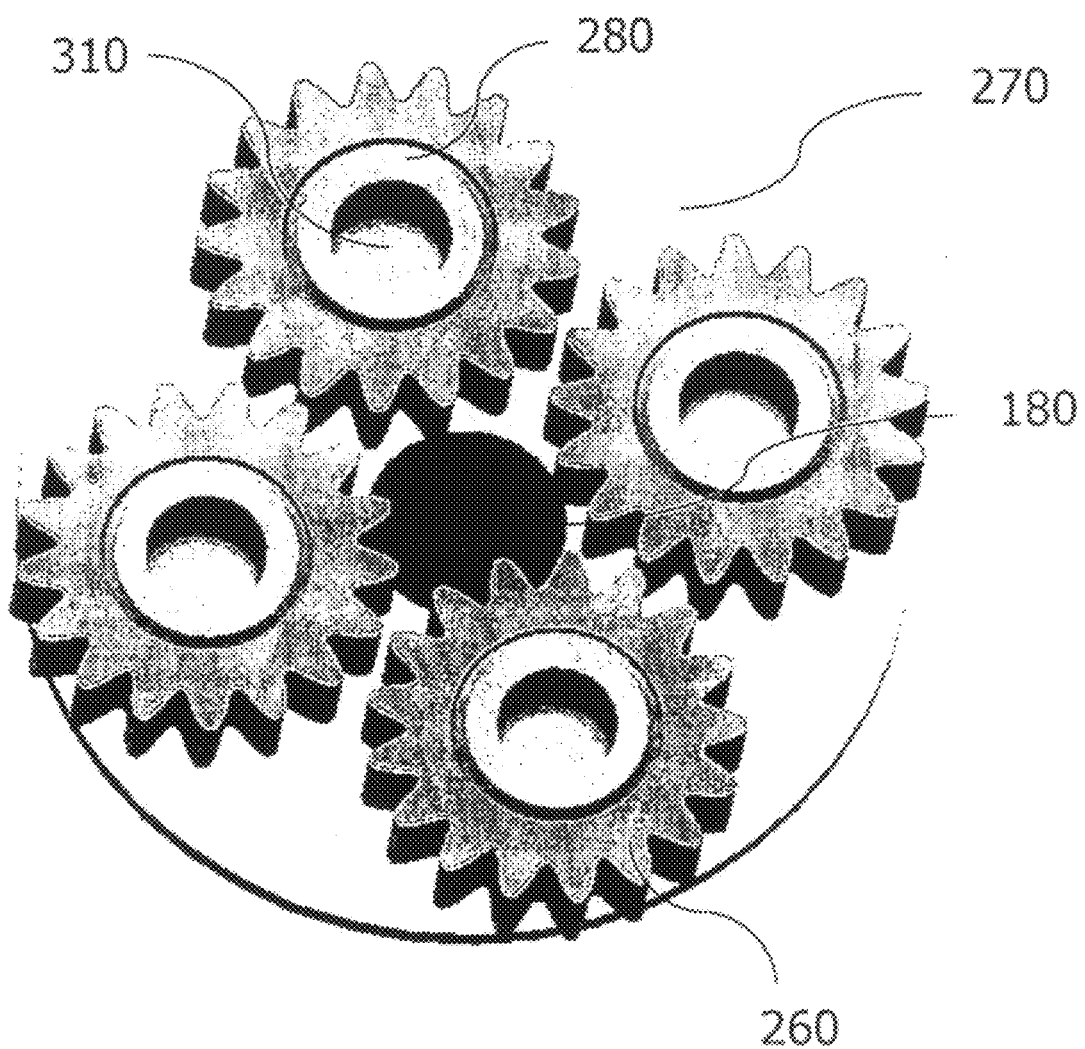
FIG. 4 shows a plan view of the planet carrier according to FIG. 3, with four planet wheels, for use with a planetary gear set of an actuator according to the invention.

FIG. 4 shows the planet carrier 270 shown in FIG. 3, with planet wheels 260 which are additionally mounted on the bearing devices 280, from a different perspective. At the centre of the planet carrier 270, the driven shaft 180 can easily be seen.

Figure 5:
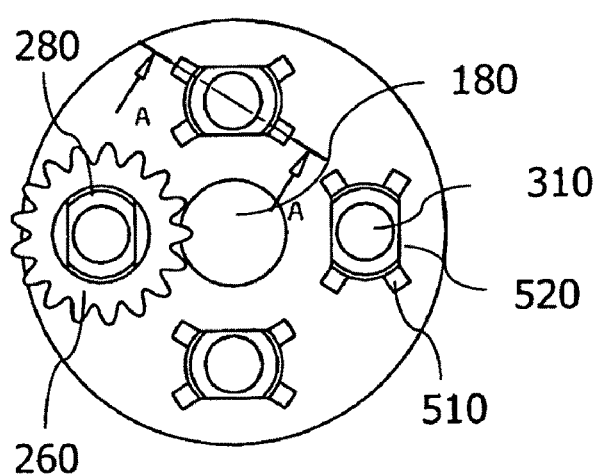
FIG. 5 shows a plan view of a planet carrier with one planet wheel, for use with a planetary gear set of an actuator according to the invention.

FIG. 5 shows a plan view of another planet carrier 270, with bearing devices 280 and a mounted planet wheel 260, which can also be used for the second stage of the planetary gear set according to FIG. 2. At the centre of the planet carrier 270 is the driven shaft 180. In this embodiment, each of the bearing devices 180 has, on its face facing away from the planet carrier 270, a bevel or flattening. This bevel can make fitting the planet wheels 260 easier.

As can also be seen in FIG. 5, each of the bearing devices 280 has multiple recesses 520 which extend axially. These recesses 520 are formed so that they have a constant cross-section along the axes of the bearing devices 280. This cross-section has the form of an arc of a circle with a chord, the arc following the running surfaces of the bearing devices 280. Clearly expressed, the examples shown in FIG. 5 of recesses 520 of the bearing devices 280 result from circular cylindrical bearing devices 280, from each of which a part is removed by a cut parallel to its normal axis (and at a distance from its centre).

Other versions of the recesses 520 are conceivable; for instance, it is not absolutely necessary that all recesses 520 of a bearing device 280 have the same shape, or that they have a constant cross-section along the normal axes of the bearing devices 280. The number of recesses 520 per bearing device 280 can also be varied. In the case of the embodiment according to FIG. 5, two recesses 520 per bearing device 280 are used, and are made opposite to each other. However, more or fewer recesses 520 per bearing device 280 can also be provided.

By using recesses 520, the surface of the bearing devices 280 in contact with the planet wheels 260 is minimised, which can result in a reduction of sliding friction. The recesses 520 can also be used to fill the spaces which occur between the running surfaces of the planet wheels 260 and the bearing devices 280 with a lubricant, e.g. a bearing grease. The recesses 520 can thus be used as a lubricant reservoir. The orientation of the recesses 520 relative to the planet carrier 270 is preferably given by those parts of the running surfaces of the bearing devices 280 which are subject to the lowest loads during operation of the planetary gear set 170. These places can be determined, for instance, after continuous loading, by analysing the wear picture of the bearing devices 280 without recesses.

Additionally, multiple spacer bodies 510, which determine the distance between the planet wheels 260 and the planet carrier 270, are associated with each of the bearing devices 280 in FIG. 5. The number, shape, position and orientation of the spacer bodies 510 are variable. The spacer bodies reduce the contact surface between the planet wheel 260 and the planet carrier 270, and can thus cause a reduction of friction in operation. The spacer bodies 510 can be formed on the planet carrier 270 and/or on the faces of the planet wheels 260 facing the planet carrier 270. Forming the spacer bodies 510 in one piece with the planet carrier 270 (see FIG. 6) or the planet wheel 260 is possible, as is forming them separately and then assembling them. In the case of the embodiment of FIG. 5, four spacer bodies 510 are used. Alternatively or additionally to the shown spacer bodies 510, which are attached to the planet carrier 270, spacer bodies attached to the planet wheels 260 can be provided. If both options are used simultaneously, care must be taken that the spacer bodies 510 of the planet wheels 260 and those of the planet carrier 270 for instance cover mutually disjunctive rings around the axis of the bearing devices 280, to avoid catching on each other.

A lubricant can be inserted into the resulting space between the planet wheels 260, the spacer bodies 510 and the planet carrier 270. A preferred embodiment provides that the thus resulting lubricant reservoirs are connected to the lubricant reservoirs which are formed by the recesses 520 of the bearing devices 280, so that the inserted lubricant can move from one reservoir to the other.

It has been shown that if a lubricant of low viscosity is used, under high gearing loads this becomes more fluid first at the places where the temperature is highest because of the loading. In this way, the most strongly loaded places of the planet wheels 260 and bearing devices 280 are automatically especially well provided with lubricant. This effect is supported if the above-mentioned reservoirs are connected to each other. However, a separated realization of the reservoirs is also possible.

Figure 6:
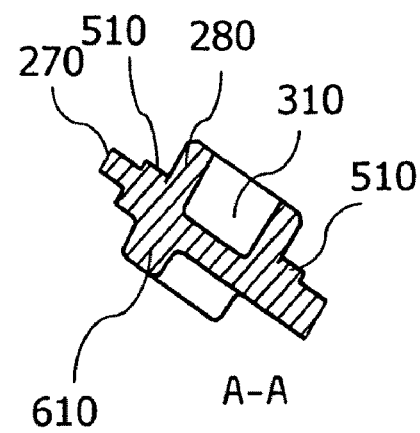
FIG. 6 shows a detailed representation of a section along the line A-A in FIG. 5.

FIG. 6 shows the section along the intersection line A-A from FIG. 5. The realization of the bearing devices 280 and planet carrier 270 in one piece can easily be seen. The realization of the spacer bodies 510 and planet carrier 270 in one piece can also be seen. In the shown embodiment, the bearing devices 280 are in the form of hollow cylinders. On the side of the planet carrier 270 facing away from the bearing devices 280 is a swelling 610. The swelling 610 can improve the stability of the planet carrier 270.

As mentioned above, the bearing devices 280 are joined substance-to-substance to the planet carrier 270. An embodiment other than the one shown in FIG. 6 provides for choosing cylindrical bearing devices 280, which are joined bluntly but in material flow to the surface of the planet carrier 270. The bearing devices 280 preferably do not extend into a recess which is made in the planet carrier 270. As joining techniques between the bearing devices 280 and the planet wheel 270, all substance-to-substance joining techniques come into question, e.g. welding, particularly friction welding, brazing, soft soldering, gluing and vulcanisation.

Both the planet carrier 270 (possibly with bearing devices 280 formed in one part) and the planet wheels 260 can be manufactured from a plastic, in particular polyphenyl sulfide. A possible production method for the planet carrier 270 (with or without the bearing devices 280 and the spacer bodies 510) includes cold forging.

Figure 7:
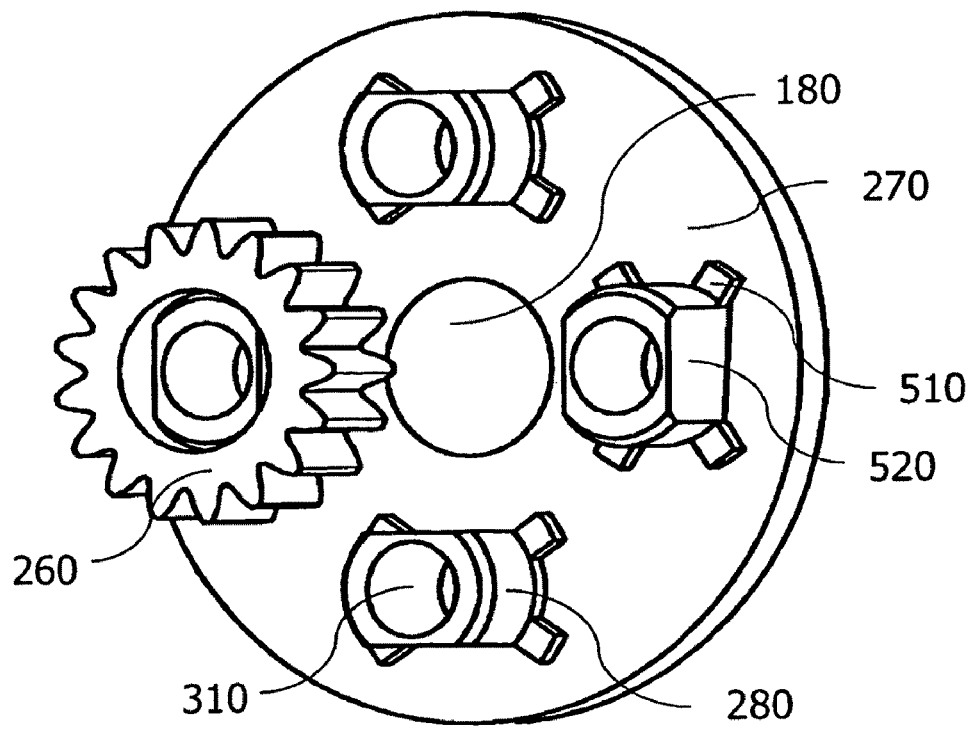
FIG. 7 shows a perspective representation of the planet carrier according to FIG. 5.

FIG. 7 shows the configuration from FIG. 5 in a perspective view. The planet carrier 270, with four bearing devices 280 and four spacer bodies 510 for each bearing device 280, is easily visible. On one of the bearing devices 280, a planet wheel 260 is mounted.

Each of the planet wheels 260 or 220 can be formed by multiple coaxial planet wheel discs with equal inner and outer diameters. Similarly, the internal gear 210 can be formed from multiple axial elements with corresponding internal sets of teeth.

Figure 8:
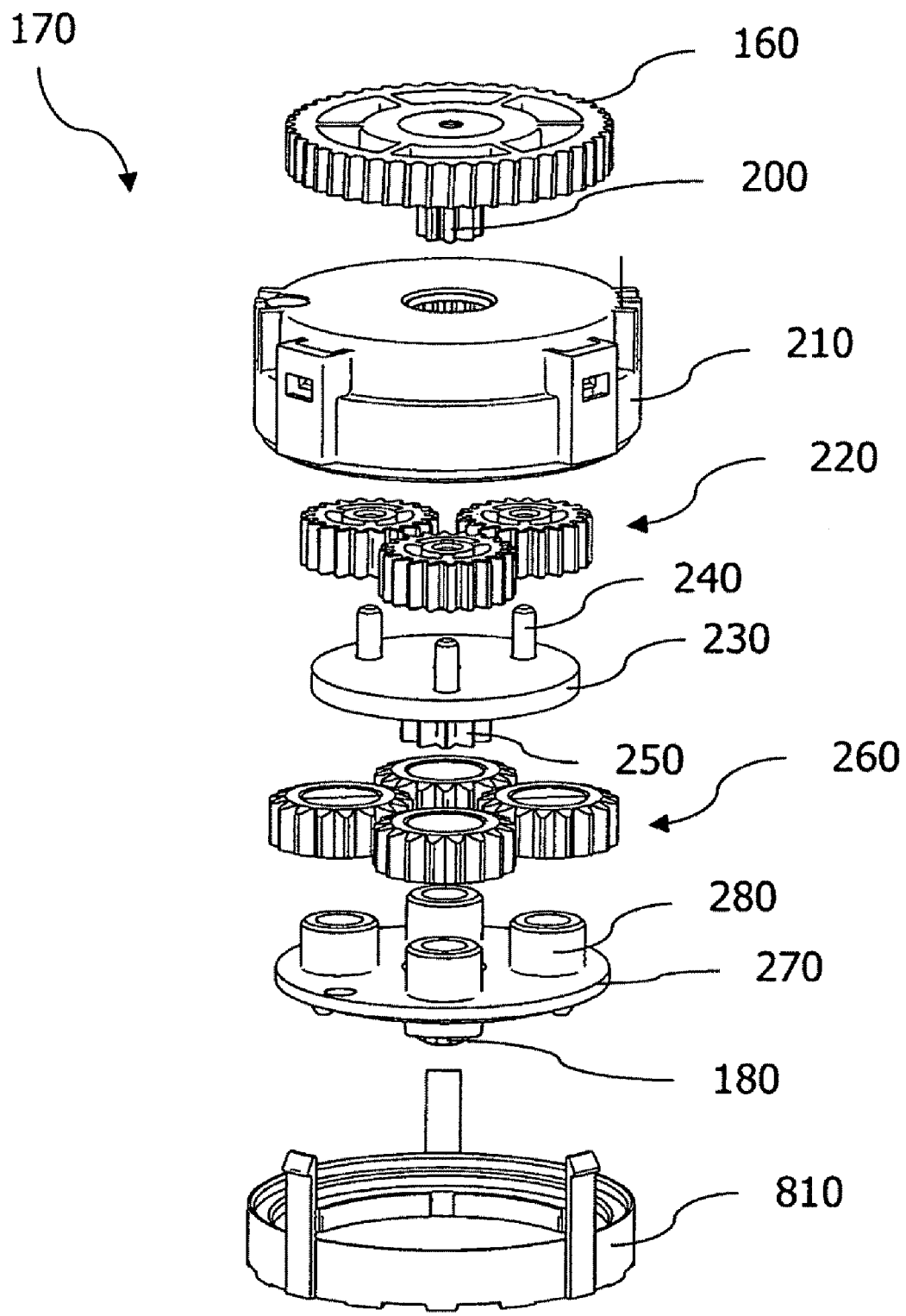
FIG. 8 shows an exploded drawing of a further embodiment of the planetary gear set from FIG. 1.

FIG. 8 shows an exploded drawing of another embodiment of the planetary gear set 170. Essentially, the shown elements correspond to the elements shown in FIG. 2, and have the same reference symbols. Therefore, only the differences of the embodiment shown in FIG. 8 compared with the embodiment shown in FIG. 2 are explained below.

A terminating ring 810 replaces the lower cover 290 from FIG. 2, and together with the internal gear 210 forms a housing of the two-stage planetary gear set 170. The terminating ring 810 is connected to the internal gear 210 by three tongues which start at the terminating ring, extend in the axial direction of the planetary gear set 170, lock into corresponding recesses of the internal gear 210, and with them form a releasable snap connection. The terminating ring 810 prevents the planet carrier 270 from falling down and out, but does not have complete cover, so that the lower planet carrier 270, when the planetary gear set 170 is assembled, is partly open in the region of the driven shaft 180. A cover of the planet carrier 270 can be inserted from inside or outside, in any way known to the person skilled in the art, into the terminating ring 810, and/or be joined to it. The lower planet carrier 270 has on its upper side four bearing devices 280, which, as shown in FIG. 3, are in the form of hollow cylinders with relatively large outer diameters. The planet wheels 260 which are carried on the bearing devices 280 have sets of teeth which are chamfered on their faces.

Figure 9:
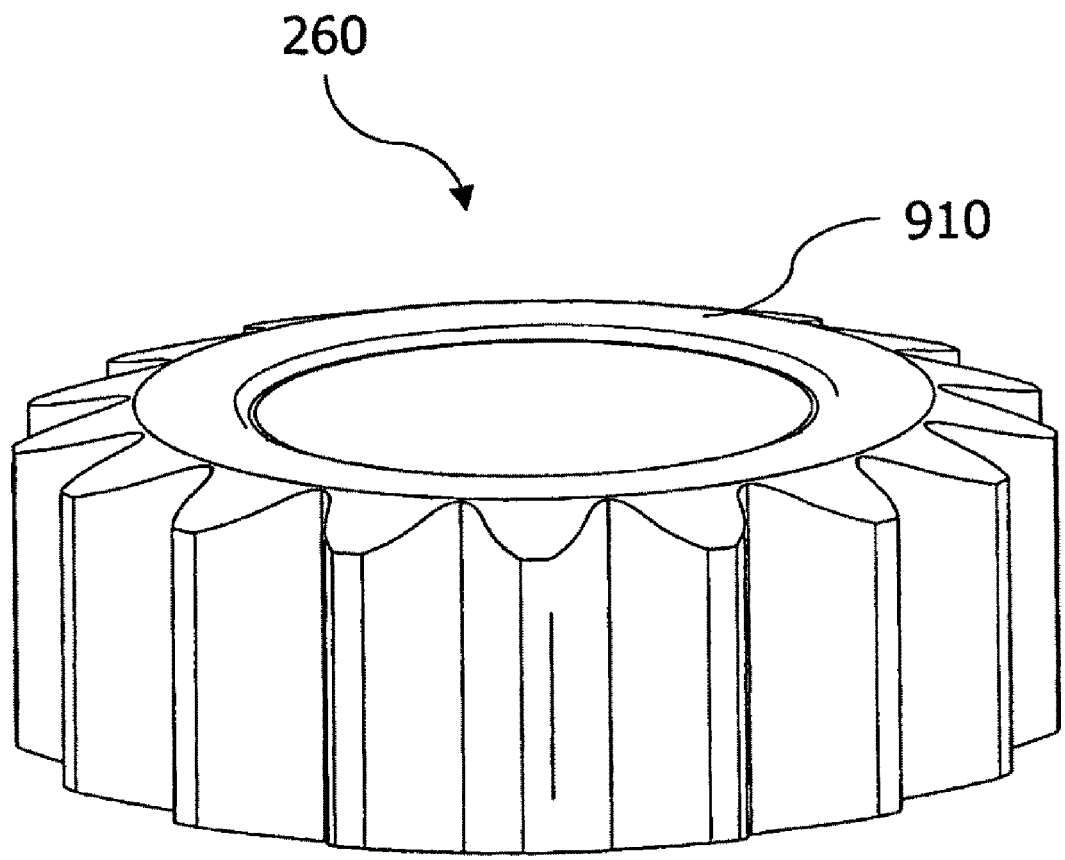
FIG. 9 shows a perspective representation of a planet wheel according to FIG. 8.

FIG. 9 shows one of the planet wheels 260 from FIG. 8 in a perspective detailed representation. The sets of teeth are chamfered on both the top and the bottom of the planet wheel 260, so that separate representation and description of the bottom is unnecessary. Because of the chamfered teeth of the planet wheel 260, towards the planet carrier 270 an axially extending surrounding edge 910, via which the planet wheel fits tightly on the planet carrier 270, is formed. The surrounding edge 910 is a form of the spacer body 510 described above with reference to FIG. 5, the spacer body 910 being formed on the face of the planet wheel 260 facing the planet carrier 270 and in one piece with it. Because of the described chamfering of the teeth of the planet wheel 260, the area on which the planet wheel 260 is in contact with the planet carrier 270 is significantly reduced. In this way the friction losses between the planet wheel 260 and the planet carrier 270 can be reduced, so that the efficiency of the planetary gear set 170, and thus also the overall efficiency of the parking brake actuator 100, is increased.

As is known to the person skilled in the art, the planet wheels 260 can for instance be produced, as well as by the above-mentioned cold forging method, by sintering, which can result in cost advantages. In relation to sintering, the chamfered set of teeth on the face of the planet wheel 260 according to FIGS. 8 and 9 is shown to be advantageous, because the removal of the planet wheel 260 from the mould, which is finally necessary in the case of sintering, is simpler to execute.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. An actuator for an electrical parking brake, the actuator comprising:
   an electric motor; and
   a planetary gear set connected downstream from the electric motor, the planetary gear set having at least one planet carrier which has multiple bearing devices for rotatably supporting planet wheels,
   wherein the bearing devices are joined to the planet carrier,
   wherein the bearing devices have generally cylindrical bearing surfaces that are in contact with corresponding running surfaces of the planet wheels, and
   wherein each of the generally cylindrical bearing surfaces includes at least one recess that does not engage the corresponding running surface of the planet wheel supported thereon.

2. The actuator according to claim 1, wherein at least one of the bearing devices carries a planet wheel rotatably, wherein the minimum distance between the planet carrier and the planet wheel in an axial direction is determined by at least one spacer body.

3. The actuator according to claim 2, wherein the at least one spacer body is formed on the planet wheel.

4. The actuator according to claim 2, wherein the at least one spacer body is formed on the planet carrier.

5. The actuator according to claim 1, wherein the bearing devices are of essentially cylindrical form.

6. The actuator according to claim 5, wherein the bearing devices are of essentially hollow cylindrical form.

7. The actuator according to claim 1 wherein the at least one recess runs in the axial direction of the bearing device.

8. The actuator according to claim 7, wherein a lubricant is inserted into a space between the planet carrier and at least one of the planet wheels.

9. The actuator according to claim 1, wherein the planet carrier is manufactured from a plastic.

10. The actuator according to claim 9 wherein the planet carrier is manufactured from polyphenyl sulfide.

11. The actuator according to claim 1, wherein the at least one planet wheel is manufactured from a plastic.

12. The actuator according to claim 11 wherein the at least one planet wheel is manufactured from polyphenyl sulfide.

13. The actuator according to claim 1, wherein the bearing devices are formed in one part with the planet carrier.

14. The actuator according to claim 1, wherein the bearing devices are separate elements which are fusion joined to the planet carrier.

15. The actuator according to claim 1, wherein the bearing devices have a diameter of at least one third of the greatest outer diameter of the planet wheels.

16. The actuator according to claim 1, wherein the bearing devices have a diameter which is greater than their axial extent.

17. The actuator according to claim 1, wherein the at least one recess is at least partly filled with a lubricant.

18. The actuator according to claim 1, wherein the planet carrier includes a driven shaft, which is joined to the planet carrier in a torque-locked manner.

19. An electrical parking brake with an actuator according to claim 1.

20. The actuator according to claim 1, wherein each of the recesses has a cross-section having the form of an arc of a circle with a chord.

\* \* \* \* \*